United States Patent
Ota et al.

(10) Patent No.: US 9,299,477 B2
(45) Date of Patent: Mar. 29, 2016

(54) ELECTRICALLY CONDUCTIVE FILM

(71) Applicant: Toray Industries, Inc., Tokyo (JP)

(72) Inventors: Kazuyoshi Ota, Otsu (JP); Yasushi Takada, Otsu (JP); Shotaro Tanaka, Otsu (JP)

(73) Assignee: Toray Industries, Inc. (JP)

( * ) Notice: Subject to any disclaimer, the term of this patent is extended or adjusted under 35 U.S.C. 154(b) by 522 days.

(21) Appl. No.: 13/785,049

(22) Filed: Mar. 5, 2013

(65) Prior Publication Data

US 2013/0264525 A1    Oct. 10, 2013

Related U.S. Application Data

(62) Division of application No. 12/678,170, filed as application No. PCT/JP2008/064268 on Aug. 8, 2008, now Pat. No. 8,414,964.

(30) Foreign Application Priority Data

Sep. 28, 2007  (JP) ................................. 2007-253719
Mar. 7, 2008   (JP) ................................. 2008-057572

(51) Int. Cl.
| | |
|---|---|
| *H01B 1/24* | (2006.01) |
| *C09D 5/24* | (2006.01) |
| *C08K 3/04* | (2006.01) |
| *B82Y 30/00* | (2011.01) |
| *C08J 7/04* | (2006.01) |
| *C09D 7/12* | (2006.01) |

(52) U.S. Cl.
CPC . *H01B 1/24* (2013.01); *B82Y 30/00* (2013.01); *C08J 7/047* (2013.01); *C09D 5/24* (2013.01); *C09D 7/1266* (2013.01); *C09D 7/1291* (2013.01); *C08J 2300/22* (2013.01); *C08J 2367/02* (2013.01); *C08J 2467/00* (2013.01); *C08K 3/04* (2013.01); *Y10S 977/752* (2013.01); *Y10S 977/753* (2013.01); *Y10S 977/932* (2013.01); *Y10T 428/25* (2015.01); *Y10T 428/31786* (2015.04); *Y10T 428/31855* (2015.04); *Y10T 428/31942* (2015.04); *Y10T 428/31971* (2015.04)

(58) Field of Classification Search
None
See application file for complete search history.

(56) References Cited

U.S. PATENT DOCUMENTS

| | | |
|---|---|---|
| 5,908,585 A | 6/1999 | Shibuta |
| 2006/0189822 A1 | 8/2006 | Yoon et al. |
| 2006/0257638 A1 | 11/2006 | Glatkowski et al. |
| 2007/0221913 A1 | 9/2007 | Lee et al. |
| 2008/0038183 A1* | 2/2008 | Nakata ............. B82Y 30/00 423/447.1 |
| 2008/0044651 A1 | 2/2008 | Douglas |
| 2008/0111110 A1 | 5/2008 | Ma et al. |
| 2008/0297022 A1 | 12/2008 | Maruyama et al. |

FOREIGN PATENT DOCUMENTS

| | | |
|---|---|---|
| JP | 2002-067209 A | 3/2002 |
| JP | 2004-195678 A | 7/2004 |
| JP | 2004-253326 A | 9/2004 |
| JP | 3665969 B2 | 6/2005 |
| JP | 2006-269311 A | 10/2006 |
| JP | 2007-112113 A | 5/2007 |
| JP | 2007-182546 A | 7/2007 |
| WO | 02/076724 A1 | 10/2002 |
| WO | WO 2005/119772 * | 5/2005 |
| WO | 2005/119772 A2 | 12/2005 |

* cited by examiner

Primary Examiner — Sheeba Ahmed
(74) Attorney, Agent, or Firm — DLA Piper LLP (US)

(57) ABSTRACT

An electrically conductive film has an electrically conductive layer on at least one side, which is a thermoplastic resin film in which the electrically conductive layer contains a carbon nanotube (A), a carbon nanotube dispersant (B) and a binder resin (C), the total of contents of (A), (B) and (C) in the electrically conductive layer is 90% by weight or more relative to the entire electrically conductive layer, and weight rates of (A), (B) and (C) satisfy the following, and a weight ratio of (B) and (A) ((B)/(A)) is 0.5 or more and 15.0 or less:

(A) 1.0 to 40.0% by weight,
(B) 0.5 to 90.0% by weight, and
(C) 4.0 to 98.5% by weight (provided that the total of contents of (A), (B) and (C) is let to be 100% by weight).

15 Claims, 2 Drawing Sheets

ELECTRICALLY CONDUCTIVE FILM

RELATED APPLICATIONS

This is a divisional application of U.S. application Ser. No. 12/678,170 filed Mar. 15, 2010, which is a §371 of International Application No. PCT/JP2008/064268, with an international filing date of Aug. 8, 2008 (WO 2009/041170 A1, published Apr. 2, 2009), which is based on Japanese Patent Application Nos. 2007-253719, filed Sep. 28, 2007, and 2008-057572, filed Mar. 7, 2008, the subject matter of which is incorporated by reference.

TECHNICAL FIELD

This disclosure relates to an electrically conductive film using a carbon nanotube (hereinafter, abbreviated as a CNT) and, more particularly, to an electrically conductive film having an electrically conductive layer, which can be manufactured by applying a CNT dispersion to a thermoplastic resin film as a substrate.

BACKGROUND

In recent years, using materials containing CNTs, materials having functions such as an anti-electrostatic property, electrical conductivity, thermal conductivity and an electromagnetic wave shielding property have been actively developed. For example, many studies regarding a composite material having functions such as an anti-electrostatic property, electrical conductivity, thermal conductivity and an electromagnetic wave shielding property, and a laminate obtained by laminating these composite materials have been performed by using a polymer such as a polyamide, a polyester, a polyether or a polyimide, or an inorganic material such as glass or a ceramic material as a matrix, and dispersing a CNT in the matrix.

As a CNT, there are a monolayer nanotube consisting of one graphene layer, and a multilayer nanotube constructed of a plurality of graphene layers. To utilize structural properties such as an extremely great aspect ratio and an extremely small diameter, and to manifest transparency, electrical conductivity and other physical properties, it is necessary to finely disperse CNTs at an extremely high level, ultimately, to monodisperse CNTs. Particularly, when the composite material is laminated on other materials, it is necessary to finely disperse a CNT in the composite material at a necessary minimum amount and at a high level so as not to give any influence on optical properties of the other materials.

In addition, to utilize properties of a CNT by coating, it is necessary to form a network structure of a finely dispersed CNT on a substrate. Thereby, it is expected that high transparency and electrical conductivity can be manifested even when the use amount of a CNT is extremely small.

Previously, processes for manufacturing an electrically conductive film by a method of applying an electrically conductive layer containing a CNT on a film, or the like, have been known. However, in these known techniques, for example, in JP-A No. 2002-67209, a coated film thickness should become extremely great to impart desired electrical conductivity, neglecting processability and transparency as an electrically conductive substrate. In addition, in JP-A No, 2004-195678, a conjugated polymer-based electrically conductive polymer is used as a binder resin to maintain electrical conductivity of a CNT in an electrically conductive layer, but an electrically conductive property which is originally possessed by a CNT is not utilized, and a resistance value as an electrically conductive film is extremely high. In JP-A No. 2007-112133, a production process of an electrically conductive film is complicated to exert an electrically conductive property of a CNT, and there is a problem in productivity and economy. Also in Japanese Patent No. 3665969, to improve an adhesion property between an electrically conductive layer and a substrate, a CNT is applied and, thereafter, the product is overcoated with a binder resin, and there is a problem in productivity and economy as in JP-A No. 2007-112133. In addition, since an organic solvent is used as a solvent in the four patent documents shown herein, it cannot be said to be optimal also in respect of environmental load. Further, for use as an electrostatic film or a transparent electrically conductive film as an electrically conductive layer containing a CNT, solvent resistance and abrasion resistance of an electrical conductive layer are important, but these properties are not referred to in the four patent documents, and there is a fear of deficiency in solvent resistance and abrasion resistance.

Also, a CNT has been dispersed in a matrix or a resin to manufacture a laminate in which a CNT is finely dispersed. However, the dispersed state of a CNT is not necessarily good and, in lamination by previous coating, it was difficult to manifest properties inherent to a CNT since a binder resin hinders electrical conductivity of a CNT, or a CNT causes aggregation in a drying step. In addition, abrasion resistance and solvent resistance were not sufficient.

It could therefore be helpful to provide an electrically conductive film excellent in transparency, electrical conductivity, abrasion resistance, and solvent resistance, and having a coated film (electrically conductive layer) in which a CNT is finely dispersed, at a lower cost than the previous manufacturing cost.

SUMMARY

We thus provide:
(1) An electrically conductive film having an electrically conductive layer on at least one side, which is a thermoplastic resin film in which the electrically conductive layer contains a carbon nanotube (A), a carbon nanotube dispersant (B) and a binder resin (C), the total of contents of (A), (B) including carboxy methylcellulose sodium and (C) in the electrically conductive layer is 90% by weight or more relative to the entire electrically conductive layer, weight rates of (A), (B) and (C) satisfy the following, and a weight ratio of (B) and (A) ((B)/(A)) is 0.5 or more and 15.0 or less:
   (A) 1.0 to 40.0% by weight
   (B) 0.5 to 90.0% by weight
   (C) 4.0 to 98.5% by weight
   (provided that the total of contents of (A), (B) and (C) is let to be 100% by weight).
(2) A process of producing the electrically conductive film of (1), including applying a carbon nanotube dispersion containing a carbon nanotube (A), a carbon nanotube dispersant (B), a binder resin (C) and a solvent (D) to at least one side of a thermoplastic film before completion of crystal orientation, thereafter stretching the thermoplastic film by a monoaxial or biaxial stretching method, and heat-treating the film at a temperature higher than the boiling point of the electrically conductive layer solvent to complete crystal orientation of the thermoplastic resin film.

Since the electrically conductive film is excellent in electrical conductivity, transparency, solvent resistance, and abrasion resistance, it can be suitably used for a variety of purposes requiring these properties. In addition, since the film can be obtained by a simpler process as compared with the previous process, the film can be manufactured at a lower cost.

DESCRIPTION OF THE REFERENCE NUMERALS

Figure 1:
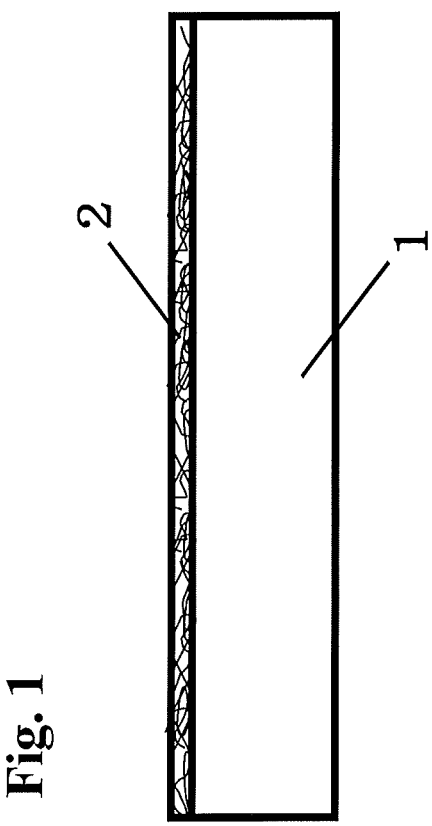
FIG. 1 is a schematic view showing one example of a cross-section of an electrically conductive film.

1. Thermoplastic resin film (substrate film)
2. Electrically conductive layer

DETAILED DESCRIPTION

The electrically conductive film will be explained in detail below.

The electrically conductive film is a film having an electrically conductive layer on at least one side of a thermoplastic resin film, and it is necessary that the electrically conductive layer contains a CNT (A), a carbon nanotube dispersant (B), and a binder resin (C).

(1) Thermoplastic Resin Film

The thermoplastic resin film is a generic name of films using a thermoplastic resin, which are melted or softened by heat, without any limitation. Examples of the thermoplastic resin include polyolefin resins such as a polyester resin, a polypropylene resin, and a polyethylene film, a polylactic acid resin, a polycarbonate resin, acrylic resins such as a polymethacrylate resin and a polystyrene resin, polyamide resins such as a nylon resin, a polyvinyl chloride resin, a polyurethane resin, a fluorine resin, and a polyphenylene resin. The thermoplastic resin used in the thermoplastic resin film may be a monopolymer or a copolymerized polymer. In addition, a plurality of resins may be used.

Representative examples of the thermoplastic resin film using these thermoplastic resins include a polyester film, polyolefin films such as a polypropylene film and a polyethylene film, a polylactic acid film, a polycarbonate film, acrylic-based films such as a polymethacrylate film and a polystyrene film, a polyamide film such as nylon, a polyvinyl chloride film, a polyurethane film, a fluorine-based film, and a polyphenylene sulfide film.

Among them, from the view point of a mechanical property, dimensional stability and transparency, a polyester film, a polypropylene film, and a polyamide film are preferable and, further, a polyester film is particularly preferable from the view point of mechanical strength and a general-use property.

In the following, a polyester resin constituting a polyester film which is particularly suitably used as the thermoplastic resin film will be explained in detail.

First, the polyester is a generic name of polymers having an ester bond as a main bonding chain of a main chain, and a polyester having, as a main constituent component, at least one kind of constituent component selected from ethylene terephthalate, propylene terephthalate, ethylene-2,6-naphthalate, butylene terephthalate, propylene-2,6-naphthalate, ethylene-α,β-bis(2-chlorophenoxy)ethane-4,4'-dicarboxylate, and the like can be preferably used. Only one kind of these constituent components may be used, or two or more kinds may be used together and, among them, ethylene terephthalate is particularly preferably used when comprehensively determining quality and economy. That is, it is preferable to use polyethylene terephthalate as the thermoplastic resin used for the thermoplastic resin film. In addition, when heat or a shrinking stress is made to act on the thermoplastic resin film, polyethylene-2,6-naphthalate excellent in heat resistance and rigidity is particularly preferable. In these polyesters, other dicarboxylic acid components or diol components may be further contained partially, preferably at 20 mol % or less.

A limiting viscosity (as measured in o-chlorophenol at 25° C.) of the polyester is in a range of preferably 0.4 to 1.2 dl/g, and more preferably 0.5 to 0.8 dl/g.

It is preferable that a polyester film using the polyester has been biaxially oriented. The biaxially oriented polyester film generally refers to a polyester film obtained by stretching a polyester sheet or film in the unstretched state, each around 2.5 to 5-fold, in a longitudinal direction and a width direction orthogonal to the longitudinal direction, and thereafter heat-treating the sheet or film to complete crystal orientation, and which exhibits a biaxial orientation pattern by wide-angle X-ray diffraction. When the thermoplastic resin film has not been biaxially oriented, thermal stability, particularly, dimensional stability and mechanical strength of the electrically conductive film are insufficient, and planarity is poor, being not preferable.

In addition, various additives, for example, antioxidants, heat resistance stabilizers, weather resistance stabilizers, ultraviolet absorbing agents, organic easy sliding agents, pigments, dyes, organic or inorganic fine particles, fillers, antistatics, and nucleating agents may be added to the thermoplastic resin film to such an extent that properties thereof are not deteriorated.

The thickness of the thermoplastic resin film is not particularly limited and is appropriately selected depending on a purpose and a kind. From the view point of mechanical strength and a handling property, usually the thickness is preferably 10 to 500 more preferably 38 to 250 μm, and most preferably 75 to 150 μm. In addition, the thermoplastic resin film may be a composite film obtained by coextrusion, or a film in which the resulting films have been laminated by various methods.

(2) Carbon Nanotube (A)

A CNT is a genetic name of seamless (non-seam) tubes in which a graphene sheet having a honey comb structure composed only of carbon atoms is rounded into a cylinder, and a tube in which a graphene sheet is substantially wound into one layer is referred to as a monolayer CNT, a tube in which a graphene sheet is wound into two layers is referred to as a bilayer CNT, and a tube in which a graphene sheet is wound into multiple layers of three or more layers is referred to as a multilayer CNT. It is preferable that the CNT (A) is any of a straight or bending-shaped monolayer CNT, a straight or bending-shaped bilayer CNT, and a straight or bending-shaped multilayer CNT or a combination thereof.

In addition, the honey comb structure refers to a network structure mainly composed of a 6-membered ring, and may have a cyclic structure other than a 6-membered ring, such as a 5-membered ring or a 7-membered ring, on a bending part of a tube or a closing part of a cross-section, from the view point of the structure of the CNT.

Further, among these CNTs, from the view point of electrical conductivity, it is preferable to use a straight and/or bending-shaped bilayer CNT, and it is more preferable to use a straight bilayer CNT. The bilayer CNT is excellent in dispersibility in a solvent, durability, and the manufacturing cost while having excellent electrical conductivity equivalent to that of a monolayer CNT. Further, when a layer on an outer side is chemically modified to impart a functional group, or a solvent having high affinity is adsorbed on a surface, the layer on the outer side can be partially destroyed, or electrical conductivity derived from the layer on the outer side can be reduced, but since a layer on an inner side remains without being transubstantiated, affinity for a solvent or a resin can be imparted while maintaining properties (particularly, electrical conductivity) as a CNT. In addition, the bilayer CNT has, on one hand, equivalent dispersibility and manufacturing cost, and has, on the other hand, much higher electrical conductivity as compared with the multilayer CNT.

In addition, it is preferable that a CNT used has a diameter of 1 nm or more. In addition, the diameter of a CNT is preferably 50 nm or less, and more preferably 10 nm or less. When the diameter is more than 50 nm, a CNT comes to have a multilayer structure of three or more layers, an electrically conducting route is diverged between layers, and electrical conductivity is reduced in some cases, being not preferable. In addition, in this case, when one tries to manifest electrical conductivity equivalent to that of a CNT having a diameter of 50 nm or less, a large amount of CNTs are required, and not only transparency of the electrically conductive film is extremely deteriorated, but also sufficient electrical conductivity cannot be attained in some cases even if the amount is increased without any limitation. Further, when the diameter of a CNT is 50 nm or more, an adhesion property and abrasion resistance of the electrically conductive layer are deteriorated in some cases. In addition, it is difficult to produce a CNT having a diameter of less than 1 mm.

It is preferable that the aspect ratio of a CNT used is 100 or more. In addition, it is preferable that the aspect ratio of a CNT is 5000 or less. Therefore, it is preferable that a CNT has a diameter of 50 nm or less or an aspect ratio of 100 or more. More preferably, the diameter is 50 nm or less, and the aspect ratio is 100 or more. Further preferably, the diameter of a CNT used is 1 nm or more and 50 nm or less, the aspect ratio is 100 or more and 5000 or less and, particularly preferably, the diameter of a CNT used is 1 nm or more and 10 nm or less, and the aspect ratio is 100 or more and 5000 or less. By making the diameter and the aspect ratio of a CNT in the aforementioned range, a CNT is excellent is electrical conductivity and, by using a dispersant or the like, it becomes possible to disperse a CNT in a solvent such as water.

In addition, the aspect ratio is a length (nm) of a carbon tube divided by a diameter (nm) of a carbon tube (length of carbon tube (nm)/diameter (nm) of carbon tube). A CNT having such properties is obtained by a known process such as a chemical deposition method, a catalytic vapor growing method, an arc discharging method, or a laser vaporizing method. Upon manufacturing of a CNT, fullerene, graphite, or amorphous carbon is simultaneously generated as a byproduct, and a catalyst metal such as nickel, iron, cobalt, or yttrium remains, therefore, it is preferable to remove these impurities to purify a CNT. For removing impurities, an ultrasonic dispersing treatment together with an acid treatment with nitric acid or sulfuric acid is effective, and it is further preferable to jointly use separation with a filter for improving purity.

The monolayer CNT or the bilayer CNT is generally thinner than the multilayer CNT and, when uniformly dispersed, a larger number of electrically conducting routes per unit volume can be ensured and electrical conductivity is high, while a semiconducting CNT may be generated as a byproduct in a large amount depending on a manufacturing process and, in that case, it becomes necessary to selectively produce or select an electrically conductive CNT. The multilayer CNT generally exhibits electrical conductivity but when the number of layers is too large, the number of electrically conducting routes per unit weight is reduced. Therefore, even when the multilayer CNT is used, the diameter of the CNT is preferably 50 nm or less, more preferably 20 nm or less, and further preferably 10 nm or less. In addition, when the monolayer CNT or the bilayer CNT is used, it is preferable from the view point of electrical conductivity that the diameter is 20 nm or less, and further preferably 10 nm or less, in the light of its structure.

It is preferable that the aspect ratio of the CNT is 100 or more and 5000 or less and, by making the aspect ratio 100 or more, electrical conductivity of the electrically conductive layer can be enhanced. This is because, when an in-line coating method described later is used in formation of the electrical conductive layer, the CNT is moderately loosened in a stretching step, an electrically conducting route between CNTs is not cut, and a network ensuring a sufficient gap between CNTs can be formed. When such a network structure is formed, a good electrically conductive property can be manifested while a transparency degree of a film is enhanced.

Therefore, it is preferable to use a CNT having an aspect ratio of 100 or more as the CNT, and the aspect ratio is more preferably 500 or more, and further preferably 1000 or more. In addition, by making the aspect ratio 5000 or less, it becomes possible to stably disperse the CNT in a solvent.

It is necessary that a compositional weight rate of the CNT (A) in the electrically conductive layer (the total of contents of (A), (B) and (C) in the electrically conductive layer is let to be 100% by weight) is 1.0% by weight or more and 40.0% by weight or less. More preferably, the rate is 6.0% by weight or more and 12.0% by weight or less, and further preferably the rate is 8.0% by weight or more and 10.0% by weight or less. In addition, in purposes requiring high electrical conductivity, it is preferable that the rate is 30.0% by weight or more and 40.0% by weight or less. By making the rate 1.0% by weight or more, it becomes easy to make the surface specific resistance value of the electrically conductive film $1.0 \times 10^{10} \Omega / \square$ or less. In addition, by making the rate 40.0% by weight or less, it becomes easy to make a total light transmittance of the electrically conductive film 70% or more. In addition, a binder resin described later can be sufficiently contained in the electrically conductive layer, and the CNT can be immobilized on the thermoplastic resin film more firmly. Thereby, abrasion resistance and solvent resistance of the electrically conductive layer can be improved.

(3) Carbon Nanotube Dispersant (B)

To finely disperse the CNT (A) in the electrically conductive layer uniformly, it is necessary to use a carbon nanotube dispersant (B). The kind of the carbon nanotube dispersant is not particularly limited, but any one of a polystyrenesulfonate salt, a polyvinylpyrrolidone-based polymer, water-soluble cellulose, and a water-soluble cellulose derivative, or a combination thereof is preferable from the view point of compatibility with a binder resin (C) described later, abrasion resistance and solvent resistance of the electrically conductive layer, and dispersing of the CNT.

Representative examples of the polystyrenesulfonate salt include sodium polystyrene-sulfonate and calcium polystyrenesulfonate.

Representative examples of the polyvinylpyrrolidone-based polymer include polyvinylpyrrolidone.

Representative examples of the water-soluble cellulose include hydroxycellulose and hydroxyalkylcellulose. Hydroxyalkylcellulose is cellulose in which a hydroxy group of a glucopyranose monomer constituting a skeleton of cellulose is replaced with a hydroxyalkyl group (when a glucopyranose monomer has a plurality of hydroxy groups, it is sufficient that at least one hydroxy group is replaced with a hydroxyalkyl group). Preferably, hydroxypropyl-methylcellulose and hydroxyethycellulose can be exemplified.

In addition, representative examples of the water-soluble cellulose derivative include a metal salt of carboxycellulose. Carboxycellulose is cellulose in which a hydroxy group of a glucopyranose monomer constituting a skeleton of cellulose is replaced with a carboxy group (when a glucopyranose monomer has a plurality of hydroxy groups, it is sufficient that at least one hydroxy group is replaced with a carboxy group). A carboxy group is a concept including not only a carboxy group in a narrow sense, but also a carboxyalkyl group. By making carboxycellulose into a metal salt, water-solubility can be dramatically enhanced, and a CNT dispersing ability can be enhanced. In addition, among metal salts of carboxycellulose, from the view point of good water-solubility, a metal salt of carboxyalkylcellulose is preferable, and carboxymethylcellulose sodium and carboxymethylcellulose calcium which are inexpensive and are widely used industrially are more preferably exemplified. Particularly preferable is carboxy-methylcellulose sodium.

In addition, as the CNT dispersant, two or more CNT dispersants may be used in combination. In addition, although details of the reason why these substances can be suitably used as a dispersant are unknown, we presume a dispersing mechanism as follows. That is, since the substances have a cyclic structure having a molecular structure consisting of carbon, it is presumed that affinity such as surface energy and/or a hydrophobic interaction with a CNT having a structure in which a conjugated structure consisting of carbon is extended, is very high. In addition, since the substances are easily soluble in water which is a suitable solvent for a CNT dispersant, and uniformly diffuse in the vicinity of the CNT in a solvent, it is presumed that aggregation due to affinity between CNTs is inhibited. For this reason, it is presumed that, by using the substances, a stable and finely dispersed CNT dispersion can be made.

It is preferable to use at least water-soluble cellulose or a water-soluble cellulose derivative as the CNT dispersant. Particularly preferably, at least a water-soluble cellulose derivative is used. By using these substances, dispersibility of the CNT can be further improved, and abrasion resistance, adhesion resistance and solvent resistance of the electrically conductive layer can be improved.

In addition, it is necessary that a compositional weight rate of the CNT dispersant (B) in the electrically conductive layer (the total of contents of (A), (B) and (C) in the electrically conductive layer is let to be 100% by weight) is 0.5% by weight or more and 90.0% by weight or less. By making a compositional weight rate of the CNT dispersant in the electrically conductive layer 0.5% by weight or more, it becomes possible to finely disperse the CNT. In addition, by making the rate 90.0% by weight or less, a binder resin described later can be sufficiently contained in the electrically conductive layer, and a firmer electrically conductive layer can be formed. Thereby, abrasion resistance and solvent resistance of the electrically conductive layer can be improved. In addition, the lower limit value of the compositional weight rate of the CNT dispersant in the electrically conductive layer is preferably 3.0% by weight or more, and more preferably 4.0% by weight or more. On the other hand, the upper limit value of the compositional weight rate of the CNT dispersant in the electrically conductive layer is preferably 75.0% by weight or less, more preferably 60.0% by weight or less, further preferably 48% by weight or less, and particularly preferably 20.0% by weight or less.

Therefore, the compositional weight rate of the CNT dispersant (B) in the electrically conductive layer is preferably 0.5% by weight or more and 75.0% by weight or less, more preferably 0.5% by weight or more and 60.0% by weight or less, further preferably 3.0% by weight or more and 48.0% by weight or less, and particularly preferably 4.0% by weight or more and 20.0% by weight or less. In addition, in purposes requiring high electrical conductivity, since the compositional weight rate of the CNT is preferably 30.0% by weight or more and 40.0% by weight or less, it is preferable that the CNT dispersant is contained at 15.0% by weight or more and 56.0% by weight or less depending on the amount of the CNT.

In addition, it is necessary that a weight ratio of the CNT dispersant (B) and the CNT (A) in the electrically conductive layer (CNT dispersant (B)/CNT (A)) is 0.5 or more and 15.0 or less, preferably 0.5 or more and 10.0 or less, more preferably 0.5 or more and 5.0 or less, further preferably 0.5 or more and 4.0 or less, and particularly preferably 0.5 or more and 2.0 or less. In addition, in purposes requiring high electrical conductivity, it is preferable that the weight ratio is 0.5 or more and 1.9 or less depending on the compositional weight rates of the CNT and the CNT dispersant. By making the weight ratio of (B)/(A) 0.5 or more, upon mixing with a binder resin, a CNT dispersion can be made stably without causing aggregation of a CNT and, by making the weight ratio 15.0 or less, a binder resin described later can be sufficiently contained in the electrically conductive layer, and a firmer electrically conductive layer can be formed. Thereby, abrasion resistance and solvent resistance of the electrically conductive layer can be improved.

(4) Binder Resin (C)

The binder resin is not particularly limited, and any of a thermoplastic resin, a thermosetting resin, and an ultraviolet curing resin can be used. For example, it is preferable to use an acrylic resin, a polyester resin, a urethane resin, a melamine resin, a phenol resin, an epoxy resin, a polyamide resin, a urea resin, an unsaturated polyester resin or the like, or the aforementioned resins mixed with an additive. Particularly, either one of a polyester resin and a melamine resin, or a combination thereof is preferable. By using either one of a polyester resin and a melamine resin, or a combination thereof, transparency, solvent resistance, and abrasion resistance can be easily imparted without deterioration of dispersibility of a CNT.

As the additive to be mixed with the binder resin, an antioxidant, a heat resistance stabilizer, a weather resistance stabilizer, an ultraviolet absorbing agent, an organic easy sliding agent such as a natural or petroleum wax, a pigment, a dye, an organic or inorganic fine particle, a filler, and a nucleating agent may be added to such an extent that properties of the resin and dispersibility of a CNT are not deteriorated. A role of the binder resin is to fix a CNT on the film, and to impart properties required for the electrically conductive film such as transparency and a hard coating property, and it is preferable that an electrically conductive layer compositional rate (% by weight of a binder resin, letting the total of contents of (A), (B) and (C) in the electrically conductive layer to be 100% by weight) is made to be as great as possible in such a range that electrical conductivity of a CNT is not impaired. This is because, when the electrically conductive layer compositional rate is great, dropping of a CNT from the electrically conductive layer can be easily prevented and, when a transparent resin is used for a binder, transparency of the electrically conductive film can be easily imparted.

Therefore, it is necessary that a content of the binder resin (C) in the electrically conductive layer as expressed by a compositional weight rate in the electrically conductive layer (the total of contents of (A), (B) and (C) in the electrically conductive layer is let to be 100% by weight) is 4.0% by weight or more and 98.5% by weight or less. The content is preferably 5.0% by weight or more and 98.5% by weight or less. By making the content 4.0% by weight or more, dropping of a CNT from the electrically conductive layer can be prevented and, when a transparent resin is used as a binder resin, high transparency can be imparted to the electrically conductive film. On the other hand, by making the content 98.5% by weight of less, electrical conductivity of the electrically conductive layer can be more enhanced. In addition, the lower limit value of the compositional weight rate of the binder resin (C) in the electrically conductive layer is preferably 20.0% by weight or more, more preferably 35.0% by weight or more, further preferably 40.0% by weight or more, and particularly preferably 70.0% by weight or more. On the other hand, the upper limit value of the compositional weight rate of the binder resin (C) in the electrically conductive layer is preferably 91.0% by weight or less, and more preferably 88.0% by weight or less.

Therefore, the compositional weight rate of the binder resin (C) in the electrically conductive layer is preferably 20.0% by weight or more and 98.5% by weight or less, more preferably 35.0% by weight or more and 98.5% by weight or less, further preferably 40.0% by weight or more and 91.0% by weight or less, and particularly preferably 70.0% by weight or more and 88.0% by weight or less. In addition, in purposes requiring high electrical conductivity, since it is preferable that the compositional weight rate of a CNT is 30.0% by weight or more and 40.0% by weight or less, and the compositional weight rate of the CNT dispersant is 15.0% by weight or more and 56.0% by weight or less, it is preferable that the compositional weight rate of the binder resin is 4.0% by weight or more and 55.0% by weight or less in order that solvent resistance and abrasion resistance are not reduced.

(5) Electrically Conductive Layer

As described above, it is necessary that the electrically conductive layer contains the CNT (A), the CNT dispersant (B) and the binder resin (C) and, further, it is necessary that the total of contents of (A), (B) and (C) in the electrically conductive layer is 90% by weight or more relative to the entire electrically conductive layer. By making the total of contents of (A), (B) and (C) 90% by weight or more relative to the entire electrically conductive layer, the effect can be exerted. It is preferable that the total of contents of (A), (B) and (C) in the electrically conductive layer is 95% by weight or more relative to the entire electrically conductive layer, and it is more preferable that the electrically conductive layer consists of (A), (B) and (C).

On the other hand, when the total is less than 10% by weight relative to the entire electrically conductive layer, other components may be contained in the electrically conductive layer to such an extent that properties of the binder resin and dispersibility of the CNT are not deteriorated. For example, to enhance wettability of a carbon nanotube dispersion onto a thermoplastic resin film, an arbitrary surfactant may be contained and, to impart an easy sliding property of the electrically conductive film, an organic easy sliding agent such as a natural or petroleum wax, a releasing agent and a particle may be contained.

(6) Method of Forming Electrically Conductive Layer

The electrically conductive layer can be formed by applying a carbon nanotube dispersion containing the aforementioned CNT (A), CNT dispersant (B) and binder resin (C) and, optionally, a solvent (D) to a thermoplastic resin film, and drying the solvent (D) to cure the binder resin (B) (FIG. 1). A specific process for preparing a CNT dispersion will be described later.

As the solvent (D), an aqueous solvent (d) or an organic solvent (d') can be used, and preferable is the aqueous solvent (d). This is because, by using an aqueous solvent, rapid evaporation of the solvent in a drying step can be suppressed, and not only a uniform electrically conductive layer can be formed, but also the aqueous solvent is excellent in respect of environmental load.

The aqueous solvent (d) refers to water, or a solvent in which water, and an organic solvent soluble in water including an alcohol such as methanol, ethanol, isopropyl alcohol or butanol, a ketone such as acetone or methyl ethyl ketone, or a glycol such as ethylene glycol, diethylene glycol or propylene glycol is mixed at an arbitrary ratio.

In addition, the organic solvent (d') refers to a solvent other than the aqueous solvent, and refers to a solvent not substantially containing water. The kind of the organic solvent is not particularly limited, and examples thereof include alcohols such as methanol, ethanol, isopropyl alcohol and butanol, ketones such as acetone and methyl ethyl ketone, glycols such as ethylene glycol, diethylene glycol and propylene glycol, aromatic solvents such as benzene and toluene, and hydrocarbons such as hexane.

As a method of applying the CNT dispersion to a film, either of an in-line coating method or an off coating method can be used, but preferable is the in-line coating method.

The in-line coating method is a method of performing application in a production process of a thermoplastic resin film. Specifically, it refers to a method of performing application at an arbitrary stage from melt extrusion of a thermoplastic resin to a heat treatment and winding up after biaxial stretching. Usually, the dispersion is applied to any film of an unstretched (unoriented) thermoplastic resin film in a substantially amorphous state, obtained by melt extrusion and rapid cooling thereafter (A film), a monoaxially stretched (monoaxially oriented) thermoplastic resin film stretched in a longitudinal direction thereafter (B film), or a biaxially stretched (biaxially oriented) thermoplastic resin film before a heat treatment, which has been further stretched in a width direction (C film).

It is preferable to adopt a method of applying a CNT dispersion to any thermoplastic resin film of the A film, the B film and the C film before completion of crystal orientation, thereafter stretching the thermoplastic resin film monoaxially or biaxially, and heat-treating the film at a temperature higher than the boiling point of a solvent to complete crystal orientation of the thermoplastic resin film, and, at the same time, providing an electrically conductive layer. According to the method, since making of the thermoplastic resin film, and application and drying of the CNT dispersion (i.e., formation of an electrically conductive layer) can be performed simultaneously, there is a merit in terms of the production cost. In addition, it is easy to reduce the thickness of the electrically conductive layer since stretching is performed after application. In addition, by making the temperature of the heat treatment performed after application a temperature higher than the boiling point of a solvent, the binder resin can be effectively solidified and cured, and abrasion resistance and solvent resistance of the electrically conductive layer can be improved. Further, by the step of stretching the thermoplastic resin film, the CNT in the CNT dispersion is moderately loosened and an electrically conductive film excellent in transparency and electrical conductivity can be obtained.

Inter alia, a method of applying the CNT dispersion to a film (B film) which has been monoaxially stretched in a longitudinal direction, thereafter stretching the film in a width direction, and heat-treating the film is excellent. The reason is as follows: since the number of stretching steps is smaller by one time as compared with a method of applying the CNT dispersion to an unstretched film and thereafter performing biaxial stretching, cutting of an electrically conducting route between CNTs due to stretching hardly occurs, and an electrically conductive layer excellent in electrical conductivity can be formed.

On the other hand, the off-line coating method is a method of applying a CNT dispersion to a film obtained after stretching the A film monoaxially or biaxially and heat-treating the film to complete crystal orientation of a thermoplastic resin film, or to the A film, in a step separate from a step of making a film.

It is preferable that the electrically conductive layer is provided by the in-line coating method for the reason of the aforementioned various advantages.

Therefore, the best method of forming an electrically conductive layer is a method of applying a CNT dispersion using an aqueous solvent (d) as the solvent (D) to a thermoplastic resin film using the in-line coating method, and drying the dispersion. In addition, more preferable is a method of in-line coating a B film with a CNT dispersion coating solution after monoaxial stretching.

(7) Preparation of CNT Dispersion

A method of preparing a CNT dispersion in a case where the aqueous solvent (d) is used as the solvent (D) will be explained below, and a CNT dispersion in a case where an organic solvent is as the solvent can be made by a similar method.

For preparing the CNT dispersion, it is preferable that, first, a CNT water dispersion in which a CNT is dispersed in a solvent is prepared. As a method of making the CNT water dispersion, there are:

(I) a method of dissolving a CNT dispersant in water as a solvent, adding a CNT thereto, and mixing and stirring this to prepare a CNT water dispersion, (II) a method of preliminarily dispersing a CNT in water by ultrasonic dispersing or the like in advance, thereafter adding a CNT dispersant thereto, followed by mixing and stirring this to prepare a CNT water dispersion, and (III) a method of placing a CNT and a CNT dispersant in water, followed by mixing and stirring this to prepare a CNT water dispersion.

Any methods may be used alone or in combination. In addition, in the stirring method, a magnetic stirrer or a stirring wing may be used, or ultrasonic irradiation or vibration dispersing can be performed. Among them, the method (III) is preferable in that unnecessary aggregation of a CNT generated by contact with water is prevented, and a CNT can be efficiently dispersed in water.

Then, it is preferable that a binder resin is added to the CNT water dispersion, and mixing and stirring are performed using the methods (I) to (III), thereby, a CNT dispersion is made. In addition, upon addition of a binder resin, if necessary, the aforementioned various additives may be added to such an extent that the binder resin properties and dispersibility of a CNT are not deteriorated.

(8) Application System

As an application system, the known application systems, for example, an arbitrary system such as a bar coating method, a reverse coating method, a gravure coating method, a dye coating method, or a blade coating method can be used.

(9) Process for Producing Electrically Conductive Film

Then, regarding a process for producing the electrically conductive film, an example of a case using a polyethylene terephthalate (hereinafter, abbreviated as PET) film as the thermoplastic resin film will be explained, but the process is naturally not limited to this.

First, after PET pellets are sufficiently vacuum-dried, the pellets are supplied to an extruder, melt-extruded into a sheet at about 280° C., and cooled to solidify to prepare an unstretched (unoriented) PET film (A film). This film is stretched 2.5 to 5.0-fold in a longitudinal direction with a roll heated to 80 to 120° C. to obtain a monoaxially oriented PET film (B film). To one side of this B film, the CNT dispersion prepared to have a predetermined concentration is applied. Thereupon, before application, a surface of the PET film to be coated may be subjected to a surface treatment such as a corona discharge treatment. By performing a surface treatment such as a corona discharge treatment, wettability of the CNT dispersion onto the PET film is improved, and repellency of the CNT dispersion is prevented, thereby, a uniform coating thickness can be attained.

After application, an end of the PET film is grasped with a clip, guided to a heat treatment zone of 80 to 130° C. (preheating zone), and water as a solvent for the electrically conductive layer is dried. After drying, the film is stretched 1.1 to 5.0-fold in a width direction. When a CNT is loosened in the stretching step in in-line coating, a network ensuring a sufficient gap between CNTs can be formed without cutting an electrically conducting route between CNTs. Subsequently, the film is guided to a heat treatment zone of 160 to 240° C. (heat-fixing zone), and heat-treated for 1 to 30 seconds to complete crystal orientation.

In this heat-treating step (heat-fixing step), if necessary, 3 to 15% of a relaxing treatment may be performed in a width direction or a longitudinal direction. The thus obtained film is a transparent electrically conductive film of high electrical conductivity, fixed in a state where a CNT is finely dispersed in the electrically conductive layer.

The thickness of the electrically conductive layer is preferably 2 nm or more and 500 nm or less. When the thickness of the electrically conductive layer is 2 nm or more, an electrically conductive film having high electrical conductivity can be prepared and, when the thickness is 500 nm or less, transparency can be maintained.

(10) Physical Properties of Electrically Conductive Film

The surface specific resistance value of the electrically conductive film is preferably $1.0 \times 10^{10} \Omega/\square$ or less. When the surface specific resistance value is $1.0 \times 10^{10} \Omega/\square$ or less, it is indicated that a CNT is well dispersed, and a total light transmittance of 70% or more can be easily attained while excellent electrical conductivity is possessed. The lower limit is not particularly limited, but from the electrically conductive layer compositional weight rate, as a region where electrical conductivity of a CNT can be exerted, $1.0 \times 10^{2} \Omega/\square$ is a limit value (lower limit).

Examples of a means to attain the aforementioned range of the surface specific resistance value of the electrically conductive film include use of a bilayer CNT as a CNT, and a compositional weight rate of the CNT (A) in an electrically conductive layer of 8.0% by weight or more (the total of contents of (A), (B) and (C) in the electrically conductive layer is let to be 100% by weight).

In addition, it is preferable that, in the electrically conductive film, a surface resistance value B ($\Omega/\square$) of an electrically conductive layer surface after a rubbing treatment, and a surface resistance value A ($\Omega/\square$) of an electrically conductive layer surface before a rubbing treatment satisfy the following equation. Details of the rubbing treatment will be described later.

B/A≤10.0

Examples of an attainment means to satisfy the above relational equation of the surface specific resistance values A and B of the electrically conductive film include use of a bilayer CNT as a CNT, and use of a CNT having a diameter of 50 nm or less.

Further, in the electrically conductive film, it is preferable that the surface resistance value A ($\Omega/\square$) of an electrically conductive layer surface is $1.0\times10^{10}\Omega/\square$ or less, and the surface resistance value B ($\Omega/\square$) of an electrically conductive layer surface after a rubbing treatment satisfies B/A≤10.0.

Examples of a means to attain this include use of a bilayer CNT as a CNT, a compositional weight rate of the CNT (A) in the electrically conductive layer (the total of contents of (A), (B) and (C) in the electrically conductive layer is let to be 100% by weight) of 8.0% by weight or more, and use of a CNT having a diameter of 50 nm or less.

In addition, it is preferable that the electrically conductive film has its total light transmittance of 70% or more. When the total light transmittance is 70% or more, from the view point of formation of an electrically conductive layer containing a CNT, it is indicated that a CNT is well dispersed and, in addition, when an electrical property inherent to a CNT is utilized, sufficient electrical conductivity is obtained. Further, the film can be suitably used for purposes requiring transparency, as purposes of the electrically conductive film. The upper limit is not particularly limited, but in view of light reflection of a film surface, a total light transmittance of 92% is the physical limit value (upper limit) when an electrically conductive layer is formed on a thermoplastic resin film.

Examples of a means to attain the total light transmittance of the electrically conductive film of 70% or more include use of a bilayer CNT as a CNT, use of a CNT having a diameter of 50 nm or less, and a compositional weight rate of the CNT (A) in the electrically conductive layer (the total of contents of (A), (B) and (C) in the electrically conductive layer is let to be 100% by weight) of 40.0% by weight or less.

Further, it is preferable that the electrically conductive film is colorless and transparent, not inclined toward blue or green characteristic to an electrically conductive polymer, which is an obstacle for development for various purposes, or yellow characteristic to ITO. Therefore, it is preferable that a color tone of the electrically conductive film is such that, in the Lab color system stipulated JIS-Z-8722, an a value is −1.0 to 1.0, and a b value is −0.5 to 5.0. When the a value is less than −1.0, green is stressed, and when the a value is more than 1.0, red is stressed. When the b value is less than −0.5, blue is stressed, and when the b value is more than 5.0, yellow is stressed.

Examples of a means to attain the aforementioned range of the color tone of the electrically conductive film include use of a bilayer CNT as a CNT, use of a CNT having a diameter of 50 nm or less, and a compositional weight rate of the CNT (A) in the electrically conductive layer (the total of contents of (A), (B) and (C) in the electrically conductive layer is let to be 100% by weight) of 40.0% by weight or less.

(Measuring method)

(1) Method of Determining CNT and Method of Confirming Diameter and Aspect Ratio In a method of determining a CNT species, its form was observed with a high resolution transmission electron microscope ((TEM) H-9000UHR (manufactured by Hitachi, Ltd.)) at a magnification of 100,000 to 1,000,000, and a tube including one layer of a graphene sheet was defined as a monolayer CNT, a tube including two layers of graphene sheets was defined as a bilayer CNT, and a tube including three or more layers of graphene sheets was defined as a multilayer CNT.

In addition, a tube in which a carbon skeleton having an angle relative to a tube planar direction being changed by 30° or more is grown at any part of the tube was defined as a bending-shaped CNT. Other tubes were defined as straight-shaped CNTs. When a CNT has a structure other than a 6-membered ring structure such as a 5-membered ring or 7-membered ring structure in a carbon skeleton of the tube, the carbon skeleton may grow with an angle relative to a tube planar direction being changed by 30° or more in some cases (becoming a bending-shaped CNT in some cases). In addition, when a carbon skeleton of the tube has a honey comb structure only of a 6-membered ring, the carbon skeleton grows linearly, becoming a straight-shaped CNT.

Further, regarding the diameter and the aspect ratio, for example, upon observation of a form of a CNT at a magnification of 500,000, arbitrary 100 tubes were observed from a plurality of fields, the diameter and the tube length of each CNT were measured, and the aspect ratio was calculated. Then, the averages of diameters and aspect ratios of 100 tubes were calculated to obtain the final diameter and aspect ratio.

(2) Confirmation of CNT Network Structure in Electrically Conductive Layer

Figure 2:
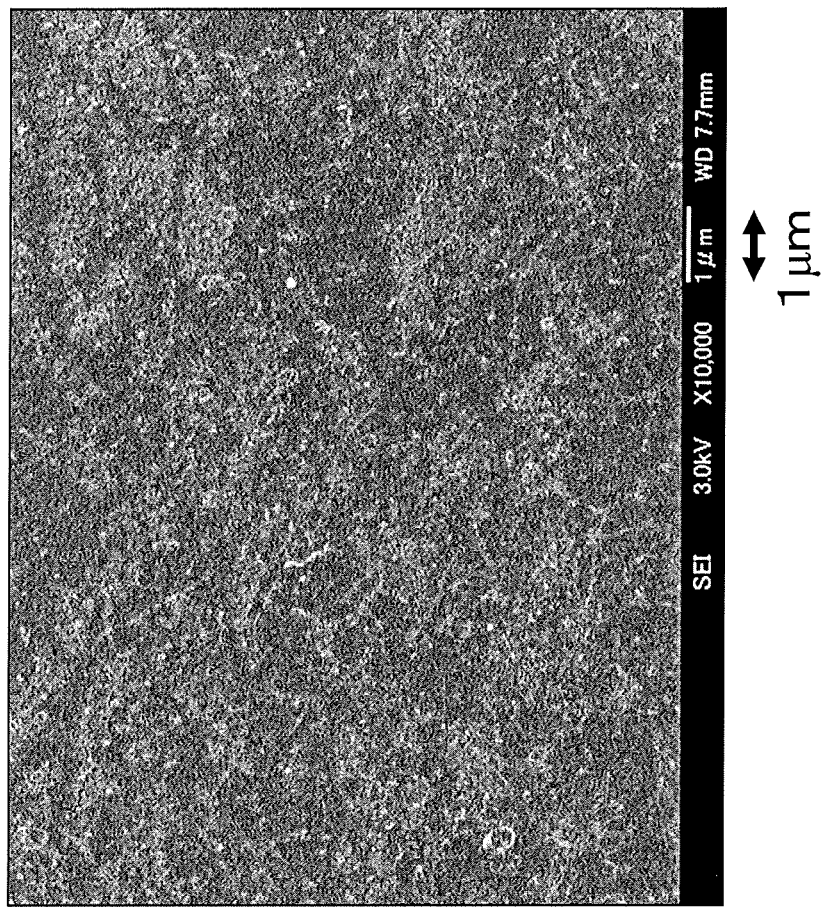
FIG. 2 is a photograph showing one example of surface observation, with an electron microscope, if the electrically conductive film.

A form of a surface of the electrically conductive film was observed with a field emission scanning electron microscope ((FE-SEM) JIM-6700F (manufactured by JEOL Ltd.)) at a magnification of 500 to 100,000. When a network structure is uniformly formed, the structure is observed as shown in FIG. 2.

(3) Thickness of Electrically Conductive Layer

The thickness of the electrically conductive layer was obtained by calculation from the solid matter concentration of a CNT dispersion and the nominal wet coating amount of a coater, letting the specific gravity of the CNT dispersion to be 1.0 g/cm$^3$.

(4) Surface Specific Resistance Value

For measuring a surface specific resistance, the electrically conductive film is allowed to stand in the normal state (23° C., relative humidity 65%) for 24 hours, and the resistance can be measured using High Star UP (manufactured by Mitsubishi Chemical Corporation, Model: MCP-HT450) based on JIS-K-6911 (1995 edition) under the same atmosphere. The number of samples (A4 size: 21 cm×30 cm) to be measured regarding each example and comparative example was 1, measurement was performed once regarding each of different five points on the samples, and the resulting average of five points was defined as the surface specific resistance. When the electrically conductive layer was laminated only on one side of the thermoplastic resin film, the surface on which the electrically conductive layer was laminated was measured. On the other hand, when the electrically conductive layers are laminated on both sides of the thermoplastic resin film, an average of five points measurement on one side, and an average of five points measurement on the other side were obtained, respectively, and the surface specific resistance for each side was obtained.

(5) Total Light Transmittance

The total light transmittance was measured using a wholly automatic direct reading haze computer "HGM-2DP" manufactured by Suga Test Instrument Co. Ltd. after the electrically conductive film was allowed to stand for 2 hours in the normal state (23° C., relative humidity 65%). An average of three times of measurement was defined as the total light transmittance of the electrically conductive film. In addition, when the electrically conductive layer was laminated only on one side of a film, the electrically conductive film was disposed so that light was introduced only through the side on which the electrical conductive layer was laminated.

(6) Adhesion Property/Abrasion Resistance Test of Electrically Conductive Layer

To assess an adhesion property between the electrically conductive layer and the thermoplastic resin film and abrasion resistance of the electrically conductive layer, a surface of the electrically conductive layer was rubbed 50 times with a load of 200 g/mm² using a swab (manufactured by Johnson & Johnson, cotton 100%). Determination of the adhesion property/abrasion resistance was performed by observing a change in appearance visually.

Determination Criteria:
- ○: No change in appearance
- ×: Either of cutting or whitening of a coated film, and dropping of a CNT (attachment of a CNT to a swab) is confirmed.

(7) Solvent Resistance Test

To assess solvent resistance of the electrically conductive layer, each of various organic solvents (methanol, ethanol, isopropyl alcohol, ethyl acetate, and hexane) was made to permeate into a swab (manufactured by Johnson & Johnson, cotton 100%), and a surface of the electrically conductive layer was rubbed 50 times with a load of 200 g/mm². Determination of solvent resistance was performed by observing a change in appearance visually.

Determination Criteria:
- ○: No change in appearance
- ×: Either of cutting or whitening of a coated film, and dropping of a CNT (attachment of a CNT to a swab) is confirmed.

(8) Change in Surface Specific Resistance Value after Rubbing Treatment (i) A surface resistance value A ($\Omega/\square$) of an electrically conductive layer surface of the electrically conductive film was obtained according to the method described in (4) "Surface specific resistance value."

(ii) An electrically conductive layer surface of the electrically conductive film was subjected to a rubbing treatment according to the rubbing method described in (6) "Adhesion property/abrasion resistance test of electrically conductive layer." In addition, a surface resistance value B1 ($\Omega/\square$) of an electrically conductive layer surface which had been subjected to a rubbing treatment of the electrically conductive film was obtained according to the method described in (4) "Surface specific resistance value."

(iii) An electrically conductive layer surface of the electrically conductive film was subjected to a rubbing treatment according to the rubbing method described in (7) "Solvent resistance test." In addition, surface resistance values B2 to B6 ($\Omega/\square$) of an electrically conductive layer surface which had been subjected to a rubbing treatment of the electrically conductive film were obtained according to the method described in (4) "Surface specific resistance value." B2 is a surface resistance value of the electrically conductive film which had been subjected to a rubbing treatment after permeating methanol into a swab. In addition, B3 is a surface resistance value of the electrically conductive film which had been subjected to a rubbing treatment after permeating ethanol into a swab. In addition, B4 is a surface resistance value of the electrically conductive film which had been subjected to a rubbing treatment after permeating isopropyl alcohol into a swab. In addition, B5 is a surface resistance value of the electrically conductive film which had been subjected to a, rubbing treatment after permeating ethyl acetate into a swab. In addition, B6 is a surface resistance value of the electrically conductive film which had been subjected to a rubbing treatment after permeating hexane into a swab.

(iv) Bn (wherein n=1 to 6)/A was obtained and, when in all of n=1 to 6, a relationship Bn/A≤10.0 is satisfied, the assessment was ○. On the other hand, when in any of n=1 to 6, a relationship Bn/A≤10.0 is not satisfied, the assessment was ×.

(9) Lab Color Tone Value

A color tone (a value, b value) of the electrically conductive film was measured by a transmission method using a spectroscopic color difference meter (SE-2000 manufactured by Nippon Denshoku Industries Co., Ltd., light source: halogen lamp 12V4A, 0° to −45° post-spectroscopic system) based on JIS-Z-8722 (2000) in the normal state (23° C., relative humidity 65%). For measurement, arbitrary five points of the electrically conductive film were measured, and their average was adopted.

EXAMPLES

Our films and processes will be explained further specifically based on examples. However, the disclosure is not limited to those examples.

Example 1

A CNT dispersion was prepared as follows.

First, 1.0 mg of a CNT (straight bilayer CNT: manufactured by Science Laboratories, diameter 5 nm), 1.0 mg of carboxymethylcellulose sodium (Sigma-Aldrich Japan) (hereinafter, abbreviated as CMC-Na) as a CNT dispersant, and 248 mg of water were placed in a 50 mL sample tube, a CNT water dispersion was prepared, ultrasonic irradiation was performed for 30 minutes using an ultrasonic grinder (VCX-502 manufactured by Tokyo Rikakikai Co., Ltd., output 250 W, direct irradiation) to obtain a uniform CNT water dispersion (CNT concentration 0.40 wt %, CNT dispersant 0.40 wt %, (B)/(A)=1.0).

Then, to this CNT water dispersion was added a thermosetting polyester resin water dispersion (manufactured by Takamatsu Oil & Fat Co., Ltd., PES resin A-120, solid matter concentration 25% by weight) as a binder resin, and the materials were mixed and stirred with a magnetic stirrer at 500 rpm for 15 minutes to obtain a CNT dispersion. Compositional weight rates of a CNT (A), a CNT dispersant (B) and a binder resin (C) in the CNT dispersion (the total of contents of (A), (B) and (C) in the CNT dispersion is let to be 100% by weight) are as follows:

(A) 9.1% by weight
(B) 9.1% by weight
(C) 81.8% by weight.

Thereupon, a weight ration of (B)/(A) was 1.0.

Then, PET pellets (limiting viscosity 0.63 dl/g) substantially containing no particles were sufficiently vacuum-dried, supplied to an extruder, melted at 285° C., extruded through a T-shaped spinneret into a sheet, and wound on a mirror surface casting drum having a surface temperature of 25° C. using an electrostatic application casting method, followed by cooling and solidification. This unstretched film was heated to 90° C., and stretched 3.4-fold in a longitudinal direction to obtain a monoaxially stretched film (B film). This film was subjected to a corona discharge treatment in the air.

Then, the CNT dispersion was applied to a corona discharge treated-surface of the monoaxially stretched film using a bar coater.

Both ends in a width direction of the monoaxially stretched film applied with the CNT dispersion were grasped with a clip, and guided to a pre-heating zone, the atmospheric temperature was adjusted to 75° C., subsequently, the atmospheric temperature was adjusted to 110° C. using a radiation heater and, then, the atmospheric temperature was adjusted to 90° C. to dry the CNT dispersion. Subsequently, the film was continuously stretched 3.5-fold in a width direction in a heating zone (stretching zone) at 120° C., subsequently, the film was heat-treated for 20 seconds in a heat treatment zone (thermal fixing zone) of 230° C. to obtain an electrically conductive film in which crystal orientation had been completed.

In the resulting electrically conductive film, the thickness of the PET film was 125 p.m. In addition, an electrically conductive layer part was observed with an electron microscope and, as a result, it was confirmed that a CNT finely dispersed in the electrically conductive layer formed a network structure randomly. Properties of the resulting electrically conductive film are shown in the tables.

Example 2

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 3

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 4

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 5

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 6

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 7

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 8

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 9

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 10

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 11

According to the same manner as that of Example 1, a CNT dispersion was obtained. Compositional weight rates of the CNT (A), the CNT dispersant (B) and the binder resin (C) in the CNT dispersion are shown in the table.

According to the same manner as that of Example 1 except that the thickness of the electrically conductive layer was changed, using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 12

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 13

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 14

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 15

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 16

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 17

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 18

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 19

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 20

According to the same manner as that of Example 1 except that the CNT was changed to a straight bilayer CNT (manufactured by Science Laboratories, diameter 3 nm), and addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 21

According to the same manner as that of Example 1 except that the CNT was changed to a straight bilayer CNT (manufactured by Science Laboratories, diameter 3 nm), and addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 22

According to the same manner as that of Example 1 except that the CNT was changed to a straight bilayer CNT (manufactured by Science Laboratories, diameter 3 nm), and addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 23

According to the same manner as that of Example 1 except that the CNT was changed to a straight bilayer CNT (manufactured by Science Laboratories, diameter 3 nm), and addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 24

According to the same manner as that of Example 1 except that addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 25

According to the same manner as that of Example 1 except that the CNT was changed to a CNT which has three or more straight/bending mixed layers (manufactured by Hyperion, diameter 15 nm), and addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 26

According to the same manner as that of Example 1 except that the CNT was changed to a CNT which has three or more straight/bending mixed layers (manufactured by Showa Denko K.K., diameter 100 nm), and addition amounts of the CNT, CMC-Na and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 27

According to the same manner as that of Example 1 except that the CNT was changed to a straight bilayer CNT (manufactured by Science Laboratories, diameter 3 nm), a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 28

According to the same manner as that of Example 1 except that the CNT was changed to a straight bilayer CNT (manufactured by Microphase Co., Ltd., diameter 10 nm), a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 29

According to the same manner as that of Example 1 except that 10.0 parts by weight of a petroleum wax as an organic easy sliding agent was added relative to the total of contents of (A), (B) and (C) in the CNT dispersion, of 90.0 parts by weight, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 30

According to the same manner as that of Example 1 except that 5.0 parts by weight of a petroleum wax as an organic easy sliding agent was added relative to the total of contents of (A), (B) and (C) in the CNT dispersion, of 95.0 parts by weight, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 31

First, a CNT dispersion was prepared. 1.0 mg of a CNT (straight/bending mixed bilayer CNT: manufactured by Science Laboratories), 2.4 mg of polyvinylpyrrolidone (manufacture by Nippon Shokubai Co., Ltd., K-30) (hereinafter, abbreviated as PVP) as a CNT dispersant, and 120.5 mg of water were placed in a 50 mL sample tube, a CNT water dispersion was prepared, and ultrasonic irradiation was performed for 30 minutes using an ultrasonic grinding machine (VCX-502 manufactured by Tokyo Rikakikai Co., Ltd., output 250 W, direct irradiation) to obtain a uniform CNT dispersion (CNT concentration 0.83 wt %, CNT dispersant 2.0 wt %, (B)/(A)=2.4). To this CNT dispersion was added a thermosetting polyester resin water dispersion (manufactured by Takamatsu Oil & Fat Co., Ltd., PES resin A-120, 25%) as a binder resin, and the materials were mixed and stirred with a magnetic stirrer at 500 rpm for 15 minutes to obtain a CNT dispersion. Compositional weight rates of a CNT (A), a CNT dispersant (B) and a binder resin (C) in the CNT dispersion (the total of contents of (A), (B) and (C) in the CNT dispersion is let to be 100% by weight) are as follows:
(A) 17.4% by weight
(B) 42.0% by weight
(C) 40.6% by weight.
Thereupon, a weight ratio of (B)/(A) was 2.4.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 32

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 33

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 34

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 35

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 36

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 37

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μM. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 38

According to the same manner as that of Example 31 except that addition amounts of the CNT, PVP and the thermosetting polyester resin water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 39

According to the same manner as that of Example 31 except that the binder resin (C) was changed to a polyaniline water dispersion, and addition amounts of the CNT, PVP and the polyaniline water dispersion were changed, a CNT dispersion was obtained. Compositional weight rates of the CNT (A), the CNT dispersant (B) and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Example 40

First, a CNT dispersion was prepared. 1.0 mg of a CNT (bilayer CNT: manufactured by Science Laboratories), 2.4 mg of sodium polystyrenesulfonate (manufactured by Tosoh Organic Chemical Co., Ltd.) (hereinafter, abbreviated as PSS) as a CNT dispersant, and 120.5 mg of water were placed in a 50 mL sample tube, a CNT water dispersion was prepared, and ultrasonic irradiation was performed for 30 minutes using an ultrasonic grinding machine (VCX-502 manufactured by Tokyo Rikakikai Co., Ltd., output 250 W, direct irradiation) to obtain a uniform CNT dispersion (CNT concentration 0.83 wt %, CNT dispersant 2.0 wt %, (B)/(A)=2.4). To this CNT dispersion was added a thermosetting polyester resin water dispersion (manufactured by Takamatsu Oil & Fat Co., Ltd., PES resin A-120, 25%) as a binder resin, and the materials were mixed and stirred with a magnetic stirrer at 500 rpm for 15 minutes to obtain a CNT dispersion. Compositional weight rates of CNT (A), a CNT dispersant (B) and a binder resin (C) in the CNT dispersion (the total of contents of (A), (B) and (C) in the CNT dispersion is let to be 100% by weight) are as follows:

(A) 17.4% by weight
(B) 42.0% by weight
(C) 40.6% by weight.

Thereupon, a weight ratio of (B)/(A) was 2.4.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. Properties of the resulting electrically conductive film are shown in the tables.

Comparative Example 1

According to the same manner as that of Example 1 except that addition amounts of the CNT, CMC-Na and the thermosetting polyester resin water dispersion were changed, a CNT dispersion (CNT concentration 0.40 wt %, CNT dispersant 0.40 wt %, (B)/(A)=1.0) was obtained. This dispersion was diluted with water to adjust a CNT concentration to 0.06 wt %, to obtain a CNT dispersion. Compositional weight rates of a CNT (A), a CNT dispersant (B) and a binder resin (C) in the CNT dispersion (the total of contents of (A), (B) and (C) in the CNT dispersion is let to be 100% by weight) are as shown in the tables.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. However, since the binder resin is not present in the electrically conductive layer, when adhesion property/abrasion resistance of the electrically conductive layer were tried to be assessed, the electrically conductive layer peeled off the PET film. Other properties of the resulting electrically conductive film are shown in the tables.

Comparative Example 2

A mixed solution of a CNT dispersant and a binder resin was prepared as follows.

1.0 mg of CMC-Na and 248 mg of water were placed in a 50 mL sample tube, a thermosetting polyester resin water dispersion (manufactured by Takamatsu Oil & Fat Co., Ltd., PES resin A-120, solid matter concentration 25% by weight)

as a binder resin was added, and the materials were mixed and stirred with a magnetic stirrer at 500 rpm for 15 minutes to obtain a mixed solution. Compositional weight rates of a CNT (A), a CNT dispersant (B) and a binder resin (C) in the mixed solution (the total of contents of (A), (B) and (C) in the mixed solution is let to be 100% by weight) are as shown in the table.

According to the same manner as that of Example 1 and using the mixed solution, an electrically conductive film was obtained. In the resulting electrically conductive film, the thickness of a PET film was 125 µm. A coated film part was observed with an electron microscope and, as a result, formation of a uniform coated film in which no CNT was present was confirmed. In addition, properties of the resulting film are shown in the tables, and since no CNT was present, consequently, electrical conductivity was very poor.

Comparative Example 3

According to the same manner as that of Example 1, it was tried to make a uniform CNT dispersion, so that compositional weight rates of a CNT (A) and a binder resin (C) (total of contents of (A), (B) and (C) in the CNT dispersion is let to be 100% by weight) became the rates shown in the table, by changing the addition amounts of the CNT, CMC-Na and the thermosetting polyester resin water dispersion were changed, but since the CNT dispersant (B) was not added, the CNT was not dispersed and was separated from water, and a CNT dispersion could not be made.

Comparative Example 4

According to the same manner as that of Example 1 except that addition amounts of the CNT, CMC-Na and the thermosetting polyester resin water dispersion were changed, a uniform CNT dispersion (CNT concentration 0.40 wt %, CNT dispersant 8.0 wt %, (B)/(A)=20.0) was obtained. Further, the thermosetting polyester resin water dispersion was similarly mixed, and the mixture was stirred to prepare a CNT dispersion. Compositional weight rates of a CNT (A), a CNT dispersant (B) and a binder resin (C) in the CNT dispersion (the total of contents of (A), (B) and (C) in the CNT dispersion is let to be 100% by weight) are as shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly, but electrical conductivity was poor. In addition, other properties of the resulting electrically conductive film are shown in the tables.

Comparative Example 5

According to the same manner as that of Example 1 except that addition amounts of the CNT, CMC-Na and the thermosetting polyester resin water dispersion were changed, a CNT dispersion was obtained. Compositional weight rates of a CNT (A), a CNT dispersant (B) and a binder resin (C) in the CNT dispersion (the total of contents of (A), (B) and (C) in the CNT dispersion is let to be 100% by weight) are as shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly, but electrical conductivity was poor. In addition, other properties of the resulting electrically conductive film are shown in the tables.

Comparative Example 6

According to the same manner as that of Example 1 except that addition amounts of the CNT, CMC-Na and the thermosetting polyester resin water dispersion were changed, a CNT dispersion ((B)/(A)=0.25) was prepared so that compositional weight rates as shown in the table were obtained, but aggregation of the CNT was confirmed from immediately after dispersing, and the CNT was aggregated and settled in the solution. As a result, a CNT dispersion could not be obtained.

Comparative Example 7

According to the same manner as that of Example 1 except that 12.0 parts by weight of a petroleum wax as an organic easy sliding agent was added relative to the total of contents of (A), (B) and (C) in the CNT dispersion, of 88.0 parts by weight, a CNT dispersion was obtained. Compositional weight rates of the CNT (A), the CNT dispersant (B), and the binder resin (C) in the CNT dispersion are shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly, but electrical conductivity was poor. Properties of the resulting electrically conductive film are shown in the tables.

Comparative Example 8

According to the same manner as that of Example 1 except that addition amounts of the CNT, CMC-Na and the thermosetting polyester resin water dispersion were changed, a CNT dispersion was obtained. Compositional weight rates of a CNT (A), a CNT dispersant (B) and a binder resin (C) in the CNT dispersion (the total of contents of (A), (B) and (C) in the CNT dispersion is let to be 100% by weight) are as shown in the table.

According to the same manner as that of Example 1 and using the CNT dispersion, an electrically conductive film was obtained. In the resulting electrically conductive film, the thickness of a PET film was 125 µm. An electrically conductive layer part was observed with an electron microscope and, as a result, it was confirmed that a CNT finely dispersed in an electrically conductive layer formed a network structure randomly. However, since the CNT was present in the electrically conductive layer in a large amount, when adhesion property/abrasion resistance of the electrically conductive layer were tried to be assessed, an extra CNT in the electrically conductive layer was partially peeled off the PET film. Other properties of the resulting electrically conductive film are shown in the tables.

Comparative Example 9

According to the same manner as that of Example 1 except that addition amounts of the CNT, CMC-Na and the thermosetting polyester resin water dispersion were changed, a CNT dispersion was obtained. Compositional weight rates of a CNT (A), a CNT dispersant (B) and a binder resin (C) in the CNT dispersion (the total of contents of (A), (B) and (C) in the CNT dispersion is let to be 100% by weight) are as shown in the table.

According to the same manner as that of Example 1 and using the CNT dispersion, an electrically conductive film was obtained. In the resulting electrically conductive film, the thickness of a PET film was 125 μm, An electrically conductive layer part was observed with an electron microscope and, as a result, it was confirmed that a CNT finely dispersed in an electrically conductive layer formed a network structure randomly. However, since the amount of a binder resin present in the electrically conductive layer is small, when adhesion property/abrasion resistance of the electrically conductive layer were tried to be assessed, the electrically conductive layer was partially peeled off the PET film. Other properties of the resulting electrically conductive film are shown in the tables.

Comparative Example 10

According to the same manner as that of Example 1 except that addition amounts of the CNT, CMC-Na and the thermosetting polyester resin water dispersion were changed, a CNT dispersion ((B)/(A)=0.4) was prepared so that compositional weight rates as shown in the table were obtained, but aggregation of the CNT was confirmed from immediately after dispersing, and the CNT was aggregated and settled in the solution. As a result, a CNT dispersion could not be obtained.

Comparative Example 11

According to the same manner as that of Example 31 except that addition amounts of the CNT, PVP and the thermosetting polyester resin water dispersion were changed, a CNT dispersion was obtained. Compositional weight rates of a CNT (A), a CNT dispersant (B) and a binder resin (C) in the CNT dispersion (the total of contents of (A), (B) and (C) in the CNT dispersion is let to be 100% by weight) are as shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. However, since a binder resin is not present in the electrically conductive layer, when adhesion property/abrasion resistance of the electrically conductive layer were tried to be assessed, the electrically conductive layer peeled off the PET film. Other properties of the resulting electrically conductive film are shown in the tables.

Comparative Example 12

According to the same manner as that of Example 31 except that addition amounts of the CNT, PVP and the thermosetting polyester resin water dispersion were changed, a CNT dispersion was obtained. Compositional weight rates of a CNT (A), a CNT dispersant (B) and a binder resin (C) in the CNT dispersion (the total of contents of (A), (B) and (C) in the CNT dispersion is let to be 100% by weight) are as shown in the tables.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. However, since the amount of the CNT present in the electrically conductive layer is small, electrical conductivity was poor. In addition, the CNT dispersant was excessive relative to the CNT, the electrically conductive layer was whitened, and when adhesion property/abrasion resistance of the electrically conductive layer were tried to be assessed, the electrically conductive layer peeled off the PET film. Other properties of the resulting electrically conductive film are shown in the tables.

Comparative Example 13

According to the same manner as that of Example 1 except that addition amounts of the CNT, CMC-Na and the thermosetting polyester resin water dispersion were changed, a CNT dispersion ((B)/(A)=0.3) was prepared so that compositional weight rates as shown in the table were obtained, but aggregation of the CNT was confirmed from immediately after dispersing, and the CNT was aggregated and settled in the solution. As a result, a CNT dispersion could not be obtained.

Comparative Example 14

According to the same manner as that of Example 31 except that addition amounts of the CNT, PVP and the thermosetting polyester resin water dispersion were changed, a CNT dispersion was obtained. Compositional weight rates of a CNT (A), a CNT dispersant (B) and a binder resin (C) in the CNT dispersion (the total of contents of (A), (B) and (C) in the CNT dispersion is let to be 100% by weight) are as shown in the table.

According to the same manner as that of Example 1 and using the CNT dispersion, an electrically conductive film was obtained. In the resulting electrically conductive film, the thickness of a PET film was 125 μm. An electrically conductive layer part was observed with an electron microscope and, as a result, it was confirmed that a CNT finely dispersed in an electrically conductive layer formed a network structure randomly. In addition, the CNT dispersant was excessive relative to the CNT, the electrically conductive layer was whitened, and when adhesion property/abrasion resistance of the electrically conductive layer were tried to be assessed, the electrically conductive layer peeled off the PET film. Other properties of the resulting electrically conductive film are shown in the tables.

In addition, the aspect ratios of the CNTs used in examples/comparative examples are 100 or more in all cases except for Example 26.

TABLE 1

| | Compositional weight rate of each component in electrically conductive layer (CNT dispersion) (% by weight)* | | | Weight ratio of (B)/(A) | Total of contents of (A), (B) and (C) relative to entire electrically conductive layer (% by weight) | CNT species | Number of CNT layers | CNT diameter (nm) | Thickness of electrically conductive layer (nm) |
|---|---|---|---|---|---|---|---|---|---|
| | (A) | (B) | (C) | (—) | | | | | |
| Example 1 | 9.1 | 9.1 | 81.8 | 1.0 | 100.0 | Straight | Bilayer | 5.0 | 40 |
| Example 2 | 16.7 | 16.7 | 66.6 | 1.0 | 100.0 | Straight | Bilayer | 5.0 | 40 |
| Example 3 | 40.0 | 40.0 | 20.0 | 1.0 | 100.0 | Straight | Bilayer | 5.0 | 15 |
| Example 4 | 5.0 | 50.0 | 45.0 | 10.0 | 100.0 | Straight | Bilayer | 5.0 | 40 |
| Example 5 | 1.0 | 0.5 | 98.5 | 0.5 | 100.0 | Straight | Bilayer | 5.0 | 200 |
| Example 6 | 1.0 | 15.0 | 84.0 | 15.0 | 100.0 | Straight | Bilayer | 5.0 | 40 |
| Example 7 | 40.0 | 20.0 | 40.0 | 0.5 | 100.0 | Straight | Bilayer | 5.0 | 40 |
| Example 8 | 40.0 | 56.0 | 4.0 | 1.4 | 100.0 | Straight | Bilayer | 5.0 | 40 |
| Example 9 | 6.0 | 90.0 | 4.0 | 15.0 | 100.0 | Straight | Bilayer | 5.0 | 80 |
| Example 10 | 40.0 | 40.0 | 20.0 | 1.0 | 100.0 | Straight | Bilayer | 5.0 | 80 |
| Example 11 | 9.1 | 9.1 | 81.8 | 1.0 | 100.0 | Straight | Bilayer | 5.0 | 20 |
| Example 12 | 8.0 | 4.0 | 88.0 | 0.5 | 100.0 | Straight | Bilayer | 5.0 | 40 |
| Example 13 | 8.0 | 16.0 | 76.0 | 2.0 | 100.0 | Straight | Bilayer | 5.0 | 40 |
| Example 14 | 10.0 | 5.0 | 85.0 | 0.5 | 100.0 | Straight | Bilayer | 5.0 | 40 |
| Example 15 | 10.0 | 20.0 | 70.0 | 2.0 | 100.0 | Straight | Bilayer | 5.0 | 40 |

*Total of contents of (A), (B) and (C) in electrically conductive layer (CNT dispersion) is let to be 100% by weight.

TABLE 2

| | Compositional weight rate of each component in electrically conductive layer (CNT dispersion) (% by weight)* | | | Weight ratio of (B)/(A) | Total of contents of (A), (B) and (C) relative to entire electrically conductive layer (% by weight) | CNT species | Number of CNT layers | CNT diameter (nm) | Thickness of electrically conductive layer (nm) |
|---|---|---|---|---|---|---|---|---|---|
| | (A) | (B) | (C) | (—) | | | | | |
| Example 16 | 6.0 | 3.0 | 91.0 | 0.5 | 100.0 | Straight | Bilayer | 5.0 | 40 |
| Example 17 | 6.0 | 24.0 | 70.0 | 4.0 | 100.0 | Straight | Bilayer | 5.0 | 40 |
| Example 18 | 12.0 | 6.0 | 91.0 | 0.5 | 100.0 | Straight | Bilayer | 5.0 | 40 |
| Example 19 | 12.0 | 48.0 | 40.0 | 4.0 | 100.0 | Straight | Bilayer | 5.0 | 40 |
| Example 20 | 30.0 | 15.0 | 55.0 | 0.5 | 100.0 | Straight | Bilayer | 3.0 | 20 |
| Example 21 | 30.0 | 56.0 | 14.0 | 1.9 | 100.0 | Straight | Bilayer | 3.0 | 20 |
| Example 22 | 40.0 | 20.0 | 40.0 | 0.5 | 100.0 | Straight | Bilayer | 3.0 | 20 |
| Example 23 | 40.0 | 56.0 | 4.0 | 1.4 | 100.0 | Straight | Bilayer | 3.0 | 20 |
| Example 24 | 8.0 | 8.0 | 84.0 | 1.0 | 100.0 | Straight | Bilayer | 5.0 | 40 |
| Example 25 | 8.0 | 8.0 | 84.0 | 1.0 | 100.0 | Straight/bending mixture | 3 or more layers | 15.0 | 40 |
| Example 26 | 8.0 | 8.0 | 84.0 | 1.0 | 100.0 | Straight/bending mixture | 3 or more layers | 100.0 | 40 |
| Example 27 | 9.1 | 9.1 | 81.8 | 1.0 | 100.0 | Straight | Bilayer | 3.0 | 40 |
| Example 28 | 9.1 | 9.1 | 81.8 | 1.0 | 100.0 | Straight | Bilayer | 10.0 | 40 |

*Total of contents of (A), (B) and (C) in electrically conductive layer (CNT dispersion) is let to be 100% by weight.

TABLE 3

| | Compositional weight rate of each component in electrically conductive layer (CNT dispersion) (% by weight)* | | | Weight ratio of (B)/(A) | Total of contents of (A), (B) and (C) relative to entire electrically conductive layer (% by weight) | CNT species | Number of CNT layers | CNT diameter (nm) | Thickness of electrically conductive layer (nm) |
|---|---|---|---|---|---|---|---|---|---|
| | (A) | (B) | (C) | (—) | | | | | |
| Example 31 | 17.4 | 42.0 | 40.6 | 2.4 | 100.0 | Straight/bending mixture | Bilayer | 5.0 | 40 |
| Example 32 | 13.5 | 32.4 | 54.1 | 2.4 | 100.0 | Straight/bending mixture | Bilayer | 5.0 | 40 |
| Example 33 | 8.1 | 19.4 | 72.5 | 2.4 | 100.0 | Straight/bending mixture | Bilayer | 5.0 | 40 |
| Example 34 | 13.5 | 32.4 | 54.1 | 2.4 | 100.0 | Straight/bending mixture | Bilayer | 5.0 | 100 |

TABLE 3-continued

|  | Compositional weight rate of each component in electrically conductive layer (CNT dispersion) (% by weight)* | | | Weight ratio of (B)/(A) | Total of contents of (A), (B) and (C) relative to entire electrically conductive layer (% by weight) | CNT species | Number of CNT layers | CNT diameter (nm) | Thickness of electrically conductive layer (nm) |
|---|---|---|---|---|---|---|---|---|---|
|  | (A) | (B) | (C) | (—) | | | | | |
| Example 35 | 13.5 | 32.4 | 54.1 | 2.4 | 100.0 | Straight/bending mixture | Bilayer | 5.0 | 480 |
| Example 36 | 5.0 | 50.0 | 45.0 | 10.0 | 100.0 | Straight/bending mixture | Bilayer | 5.0 | 40 |
| Example 37 | 2.8 | 6.7 | 90.5 | 2.4 | 100.0 | Straight/bending mixture | Bilayer | 5.0 | 280 |
| Example 38 | 36.4 | 54.5 | 9.1 | 1.5 | 100.0 | Straight/bending mixture | Bilayer | 5.0 | 15 |
| Example 39 | 9.1 | 30.3 | 60.6 | 3.3 | 100.0 | Straight/bending mixture | Bilayer | 5.0 | 70 |
| Example 40 | 17.4 | 42.0 | 40.6 | 2.4 | 100.0 | Straight | Bilayer | 5.0 | 40 |

*Total of contents of (A), (B) and (C) in electrically conductive layer (CNT dispersion) is let to be 100% by weight.

TABLE 4

|  | Compositional weight rate of each component in electrically conductive layer (CNT dispersion) (% by weight)* | | | Weight ratio of (B)/(A) | Total of contents of (A), (B) and (C) relative to entire electrically conductive layer (% by weight) | CNT species | Number of CNT layers | CNT diameter (nm) | Thickness of electrically conductive layer (nm) |
|---|---|---|---|---|---|---|---|---|---|
|  | (A) | (B) | (C) | (—) | | | | | |
| Comparative Example 1 | 50.0 | 50.0 | 0.0 | 1.0 | 100.0 | Straight | Bilayer | 5.0 | 2 |
| Comparative Example 2 | 0.0 | 50.0 | 50.0 | — | 100.0 | — | — | — | 40 |
| Comparative Example 3 | 50.0 | 0.0 | 50.0 | 0.0 | 100.0 | Straight | Bilayer | 5.0 | — |
| Comparative Example 4 | 3.3 | 66.0 | 30.7 | 20.0 | 100.0 | Straight | Bilayer | 5.0 | 40 |
| Comparative Example 5 | 0.9 | 13.5 | 85.6 | 15.0 | 100.0 | Straight | Bilayer | 5.0 | 40 |
| Comparative Example 6 | 1.0 | 0.3 | 98.7 | 0.3 | 100.0 | Straight | Bilayer | 5.0 | — |
| Comparative Example 8 | 40.1 | 40.1 | 19.8 | 1.0 | 100.0 | Straight | Bilayer | 5.0 | 40 |
| Comparative Example 9 | 30.0 | 66.1 | 3.9 | 2.2 | 100.0 | Straight | Bilayer | 5.0 | 40 |
| Comparative Example 10 | 30.0 | 12.0 | 58.0 | 0.4 | 100.0 | Straight | Bilayer | 5.0 | — |
| Comparative Example 11 | 29.3 | 70.7 | 0.0 | 2.4 | 100.0 | Straight/bending mixture | Bilayer | 5.0 | 2 |
| Comparative Example 12 | 3.3 | 66.0 | 30.7 | 20.0 | | Straight/bending mixture | Bilayer | 5.0 | 40 |
| Comparative Example 13 | 0.3 | 0.1 | 99.6 | 0.3 | | Straight/bending mixture | Bilayer | 5.0 | — |
| Comparative Example 14 | 4.5 | 90.0 | 5.5 | 20.0 | | Straight/bending mixture | Bilayer | 5.0 | 40 |

*Total of contents of (A), (B) and (C) in electrically conductive layer (CNT dispersion) is let to be 100% by weight.

TABLE 5

| | Compositional weight rate of each component in electrically conductive layer (CNT dispersion) (part by weight) | | | | Weight ratio of (B)/(A) (—) | Total of contents of (A), (B) and (C) relative to entire electrically conductive layer (% by weight) | Content of petroleum wax relative to entire electrically conductive layer (% by weight) |
|---|---|---|---|---|---|---|---|
| | (A) | (B) | (C) | Petroleum wax | | | |
| Example 29 | 8.19 | 8.19 | 73.62 | 10.0 | 1.0 | 90.0 | 10.0 |
| Example 30 | 8.645 | 8.645 | 77.71 | 5.0 | 1.0 | 95.0 | 5.0 |
| Comparative Example 7 | 8.008 | 8.008 | 71.984 | 12.0 | 1.0 | 88.0 | 12.0 |

TABLE 6

| | Compositional weight rate of each component in electrically conductive layer (CNT dispersion) (% by weight)* | | | Weight ratio of (B)/(A) (—) | Total of contents of (A), (B) and (C) relative to entire electrically conductive layer (% by weight) | CNT species | Number of CNT layers | CNT diameter (nm) | Thickness of electrically conductive layer (nm) |
|---|---|---|---|---|---|---|---|---|---|
| | (A) | (B) | (C) | | | | | | |
| Example 29 | 9.1 | 9.1 | 81.8 | 1.0 | 90.0 | Straight | Bilayer | 5.0 | 40 |
| Example 30 | 9.1 | 9.1 | 81.8 | 1.0 | 95.0 | Straight | Bilayer | 5.0 | 40 |
| Comparative Example 7 | 9.1 | 9.1 | 81.8 | 1.0 | 88.0 | Straight | Bilayer | 5.0 | 40 |

*Total of contents of (A), (B) and (C) in electrically conductive layer (CNT dispersion) is let to be 100% by weight.

TABLE 7

| | Surface specific resistance value ($\Omega/\square$) | Total light transmittance (%) | Adhesion property/abrasion resistance of electrically conductive layer | Solvent resistance | | | | | Change in surface specific resistance value after rubbing treatment | Color tone | |
|---|---|---|---|---|---|---|---|---|---|---|---|
| | | | | Methanol | Ethanol | Isopropyl alcohol | Ethyl acetate | Hexane | | a value | b value |
| Example 1 | $3.0 \times 10^7$ | 86 | ○ | ○ | ○ | ○ | ○ | ○ | ○ | −0.2 | 2.2 |
| Example 2 | $1.0 \times 10^7$ | 82 | ○ | ○ | ○ | ○ | ○ | ○ | ○ | −0.2 | 2.6 |
| Example 3 | $3.0 \times 10^7$ | 85 | ○ | ○ | ○ | ○ | ○ | ○ | ○ | −0.4 | 3.2 |
| Example 4 | $1.0 \times 10^9$ | 87 | ○ | ○ | ○ | ○ | ○ | ○ | ○ | −0.1 | 2.3 |
| Example 5 | $5.0 \times 10^9$ | 85 | ○ | ○ | ○ | ○ | ○ | ○ | ○ | −0.3 | 1.7 |
| Example 6 | $1.0 \times 10^{10}$ | 88 | ○ | ○ | ○ | ○ | ○ | ○ | ○ | −0.1 | 1.5 |
| Example 7 | $1.5 \times 10^5$ | 80 | ○ | ○ | ○ | ○ | ○ | ○ | ○ | −0.1 | 3.6 |
| Example 8 | $3.0 \times 10^5$ | 80 | ○ | ○ | ○ | ○ | ○ | ○ | ○ | −0.1 | 3.1 |
| Example 9 | $6.0 \times 10^8$ | 85 | ○ | ○ | ○ | ○ | ○ | ○ | ○ | −0.1 | 2.0 |
| Example 10 | $4.0 \times 10^4$ | 68 | ○ | ○ | ○ | ○ | ○ | ○ | ○ | −0.2 | 4.0 |
| Example 11 | $2.0 \times 10^9$ | 87 | ○ | ○ | ○ | ○ | ○ | ○ | ○ | −0.3 | 2.5 |
| Example 12 | $5.0 \times 10^7$ | 86 | ○ | ○ | ○ | ○ | ○ | ○ | ○ | −0.2 | 2.2 |
| Example 13 | $5.0 \times 10^7$ | 86 | ○ | ○ | ○ | ○ | ○ | ○ | ○ | −0.2 | 2.2 |
| Example 14 | $3.0 \times 10^7$ | 85 | ○ | ○ | ○ | ○ | ○ | ○ | ○ | −0.2 | 2.3 |
| Example 15 | $2.0 \times 10^7$ | 85 | ○ | ○ | ○ | ○ | ○ | ○ | ○ | −0.2 | 2.3 |
| Example 16 | $6.0 \times 10^8$ | 86 | ○ | ○ | ○ | ○ | ○ | ○ | ○ | −0.1 | 2.1 |
| Example 17 | $5.0 \times 10^8$ | 86 | ○ | ○ | ○ | ○ | ○ | ○ | ○ | −0.1 | 2.1 |
| Example 18 | $2.0 \times 10^7$ | 84 | ○ | ○ | ○ | ○ | ○ | ○ | ○ | −0.2 | 2.6 |
| Example 19 | $1.0 \times 10^7$ | 84 | ○ | ○ | ○ | ○ | ○ | ○ | ○ | −0.2 | 2.6 |

TABLE 8

| | Surface specific resistance value ($\Omega/\square$) | Total light transmittance (%) | Adhesion property/abrasion resistance of electrically conductive layer | Solvent resistance | | | | | Change in surface specific resistance value after rubbing treatment | Color tone | |
|---|---|---|---|---|---|---|---|---|---|---|---|
| | | | | Methanol | Ethanol | Isopropyl alcohol | Ethyl acetate | Hexane | | a value | b value |
| Example 20 | 3000 | 83 | ○ | ○ | ○ | ○ | ○ | ○ | ○ | −0.1 | 3.0 |
| Example 21 | 2500 | 83 | ○ | ○ | ○ | ○ | ○ | ○ | ○ | −0.1 | 3.0 |
| Example 22 | 1000 | 81 | ○ | ○ | ○ | ○ | ○ | ○ | ○ | −0.1 | 3.2 |

TABLE 8-continued

|  | Surface specific resistance value (Ω/□) | Total light transmittance (%) | Adhesion property/abrasion resistance of electrically conductive layer | Solvent resistance | | | | | Change in surface specific resistance value after rubbing treatment | Color tone | |
|---|---|---|---|---|---|---|---|---|---|---|---|
|  |  |  |  | Methanol | Ethanol | Isopropyl alcohol | Ethyl acetate | Hexane |  | a value | b value |
| Example 23 | 800 | 81 | ○ | ○ | ○ | ○ | ○ | ○ | ○ | −0.1 | 3.2 |
| Example 24 | $4.0 \times 10^7$ | 86 | ○ | ○ | ○ | ○ | ○ | ○ | ○ | −0.2 | 2.2 |
| Example 25 | $5.0 \times 10^{10}$ | 78 | ○ | ○ | ○ | ○ | ○ | ○ | ○ | −0.1 | 4.0 |
| Example 26 | $5.0 \times 10^{12}$ | 68 | X | X | X | X | X | X | X | −0.1 | 5.2 |
| Example 27 | $1.0 \times 10^7$ | 86 | ○ | ○ | ○ | ○ | ○ | ○ | ○ | −0.2 | 2.2 |
| Example 28 | $6.0 \times 10^7$ | 86 | ○ | ○ | ○ | ○ | ○ | ○ | ○ | −0.2 | 2.2 |
| Example 29 | $6.0 \times 10^7$ | 86 | ○ | ○ | ○ | ○ | ○ | ○ | ○ | −0.2 | 2.2 |
| Example 30 | $4.0 \times 10^7$ | 86 | ○ | ○ | ○ | ○ | ○ | ○ | ○ | −0.2 | 2.2 |
| Example 31 | $3.0 \times 10^4$ | 80 | ○ | X | X | X | X | X | X | −0.2 | 2.5 |
| Example 32 | $1.0 \times 10^6$ | 83 | ○ | X | X | X | X | X | X | −0.2 | 2.3 |
| Example 33 | $3.0 \times 10^7$ | 85 | ○ | X | X | X | X | X | X | −0.2 | 2.2 |
| Example 34 | $2.5 \times 10^7$ | 78 | ○ | X | X | X | X | ○ | X | −0.1 | 2.7 |
| Example 35 | $6.2 \times 10^6$ | 60 | ○ | X | X | X | ○ | ○ | X | −0.1 | 0.5 |
| Example 36 | $1.0 \times 10^9$ | 86 | ○ | X | X | X | X | X | X | −0.2 | 2.1 |
| Example 37 | $5.0 \times 10^9$ | 83 | ○ | X | X | X | X | ○ | X | −0.2 | 2.0 |
| Example 38 | $3.0 \times 10^4$ | 82 | ○ | X | X | X | X | X | X | −0.4 | 3.1 |

TABLE 9

|  | Surface specific resistance value (Ω/□) | Total light transmittance (%) | Adhesion property/abrasion resistance of electrically conductive layer | Solvent resistance | | | | | Change in surface specific resistance value after rubbing treatment | Color tone | |
|---|---|---|---|---|---|---|---|---|---|---|---|
|  |  |  |  | Methanol | Ethanol | Isopropyl alcohol | Ethyl acetate | Hexane |  | a value | b value |
| Example 39 | $1.2 \times 10^{10}$ | 92 | ○ | X | X | X | X | X | X | −3.0 | 2.5 |
| Example 40 | $3.0 \times 10^4$ | 80 | ○ | X | X | X | X | X | X | −0.2 | 2.5 |
| Comparative Example 1 | $1.0 \times 10^7$ | 87 | X | X | X | X | X | X | X | −0.1 | 4.0 |
| Comparative Example 2 | $3.0 \times 10^{15}$ | 91 | ○ | ○ | ○ | ○ | ○ | ○ | ○ | −0.1 | 0.9 |
| Comparative Example 3 | — | — | — | (Electrically conductive layer cannot be formed due to inability | | | | | — | — | — |
| Comparative Example 4 | $1.0 \times 10^{13}$ | 85 | ○ | ○ | ○ | ○ | ○ | ○ | ○ | −0.1 | 2.0 |
| Comparative Example 5 | $5.0 \times 10^{12}$ | 89 | ○ | ○ | ○ | ○ | ○ | ○ | ○ | −0.1 | 4.9 |
| Comparative Example 6 | — | — | — | (Electrically conductive layer cannot be formed due to inability | | | | | — | — | — |
| Comparative Example 7 | $2.0 \times 10^{10}$ | 86 | ○ | X | X | X | X | X | X | −0.2 | 2.2 |
| Comparative Example 8 | $2.0 \times 10^5$ | 78 | X | X | X | X | X | X | X | −0.3 | 3.0 |
| Comparative Example 9 | $8.0 \times 10^5$ | 79 | X | X | X | X | X | X | X | −0.3 | 3.0 |
| Comparative Example 10 | — | — | — | (Electrically conductive layer cannot be formed due to inability | | | | | — | — | — |
| Comparative Example 11 | $1.0 \times 10^7$ | 87 | X | X | X | X | X | X | X | −0.1 | 2.0 |
| Comparative Example 12 | $3.0 \times 10^{13}$ | 85 | X | X | X | X | X | X | X | −0.1 | 2.0 |
| Comparative Example 13 | — | — | — | (Electrically conductive layer cannot be formed due to inability | | | | | — | — | — |
| Comparative Example 14 | $2.0 \times 10^6$ | 82 | X | X | X | X | X | X | X | −0.1 | 2.1 |

INDUSTRIAL APPLICABILITY

We provide an electrically conductive film having a transparent electrically conductive layer which can be manufactured by applying a CNT dispersion to a thermoplastic resin film, and the electrically conductive film can be used for an electrostatic film, a touch panel, a transparent electrode as a substitute for ITO, or the like.

What is claimed is:

1. An electrically conductive film having an electrically conductive layer on at least one side, which is a thermoplastic resin film in which the electrically conductive layer contains a carbon nanotube (A), 1) a straight or bent-shaped bilayer carbon nanotube or 2) a straight or bent-shaped multilayer carbon nanotube, a carbon nanotube dispersant (B) comprising carboxy methylcellulose sodium and a binder resin (C), wherein the total contents of (A), (B) and (C) in the electrically conductive layer is 90% by weight or more relative to the entire electrically conductive layer, weight rates of (A), (B) and (C) are (A) 1.0 to 40.0% by weight, (B) 0.5 to 90.0% by weight, and (C) 4.0 to 98.5% by weight, respectively, and a weight ratio of (B) and (A) ((B)/(A)) is 0.5 or more and 15.0 or less:

wherein total of contents of (A), (B) and (C) is 100% by weight.

2. The electrically conductive film according to claim 1, wherein the carbon nanotube dispersant (B) further comprises at least one selected from the group consisting of a polystyrene sulfonate salt, a polyvinylpyrrolidone-based polymer, water-soluble cellulose and a water-soluble cellulose derivative.

3. The electrically conductive film according to claim 1, wherein the binder resin (C) is at least one selected from the group consisting of a polyester resin and a melamine resin.

4. The electrically conductive film according to claim 1, wherein the carbon nanotube (A) has a diameter of 50 nm or less and/or an aspect ratio of 100 or more.

5. The electrically conductive film according to claim 1, wherein a surface resistance value A ($\Omega/\square$) of an electrically conductive layer surface is $1.0\times10^{10}$ $\Omega/\square$ or less, and a surface resistance value B ($\Omega/\square$) of the electrically conductive layer surface after a rubbing treatment satisfies:

$B/A \leq 10.0$.

6. The electrically conductive film according to claim 1, wherein an a value of the Lab color system satisfies −1.0 to 1.0, and a b value satisfies −0.5 to 5.0.

7. The electrically conductive film according to claim 2, wherein the binder resin (C) is at least one selected from the group consisting of a polyester resin and a melamine resin.

8. The electrically conductive film according to claim 3, wherein the carbon nanotube (A) is at least one selected from the group consisting of a straight or bending-shaped monolayer carbon nanotube, a straight or bending-shaped bilayer carbon nanotube, and a straight or bending-shaped multilayer carbon nanotube.

9. The electrically conductive film according to claim 2, wherein the carbon nanotube (A) has a diameter of 50 nm or less and/or an aspect ratio of 100 or more.

10. The electrically conductive film according to claim 3, wherein the carbon nanotube (A) has a diameter of 50 nm or less and/or an aspect ratio of 100 or more.

11. The electrically conductive film according to claim 2, wherein a surface resistance value A ($\Omega/\square$) of an electrically conductive layer surface is $1.0\times10^{10}$ $\Omega/\square$ or less, and a surface resistance value B ($\Omega/\square$) of the electrically conductive layer surface after a rubbing treatment satisfies:

$B/A \leq 10.0$.

12. The electrically conductive film according to claim 3, wherein a surface resistance value A ($\Omega/\square$) of an electrically conductive layer surface is $1.0\times10^{10}$ $\Omega/\square$ or less, and a surface resistance value B ($\Omega/\square$) of the electrically conductive layer surface after a rubbing treatment satisfies:

$B/A \leq 10.0$.

13. The electrically conductive film according to claim 4, wherein a surface resistance value A ($\Omega/\square$) of an electrically conductive layer surface is $1.0\times10^{10}$ $\Omega/\square$ or less, and a surface resistance value B ($\Omega/\square$) of the electrically conductive layer surface after a rubbing treatment satisfies:

$B/A \leq 10.0$.

14. The electrically conductive film according to claim 2, wherein an a value of the Lab color system satisfies −1.0 to 1.0, and a b value satisfies −0.5 to 5.0.

15. The electrically conductive film according to claim 3, wherein an a value of the Lab color system satisfies −1.0 to 1.0, and a b value satisfies −0.5 to 5.0.

* * * * *